United States Patent [19]

Stude

[11] Patent Number: 5,738,274
[45] Date of Patent: *Apr. 14, 1998

[54] REUSABLE REPLY ENVELOPE

[76] Inventor: Michael Stude, 1021 S. Grove Ave., Barrington, Ill. 60010

[ * ] Notice: The term of this patent shall not extend beyond the expiration date of Pat. No. 5,400,957.

[21] Appl. No.: 750,815

[22] PCT Filed: Oct. 14, 1994

[86] PCT No.: PCT/US94/11705

§ 371 Date: Nov. 8, 1996

§ 102(e) Date: Nov. 8, 1996

[87] PCT Pub. No.: WO96/11853

PCT Pub. Date: Apr. 25, 1996

Related U.S. Application Data

[63] Continuation of Ser. No. 24,733, Mar. 1, 1993, Pat. No. 5,400,957.

[51] Int. Cl.$^6$ .................................................. B65D 27/06
[52] U.S. Cl. ...................... 229/301; 229/305; 229/313
[58] Field of Search ............................... 229/301, 302, 229/303, 304, 305, 307, 313

[56] References Cited

U.S. PATENT DOCUMENTS

| | | |
|---|---|---|
| 192,522 | 6/1877 | Marshall . |
| 1,064,302 | 6/1913 | Donohue . |
| 1,091,172 | 3/1914 | Thayer . |
| 1,575,769 | 3/1926 | Kaye . |
| 1,953,192 | 4/1934 | Rossiter . |
| 1,957,704 | 5/1934 | Drachman ............... 229/305 |
| 2,928,583 | 3/1960 | Law ........................... 229/305 |
| 3,027,067 | 3/1962 | Johnson . |
| 3,111,257 | 11/1963 | Peach . |
| 3,113,716 | 12/1963 | Howard ..................... 229/304 |
| 3,131,854 | 5/1964 | Deustchmeister ....... 229/305 |
| 3,635,392 | 1/1972 | Burgher . |
| 3,977,597 | 8/1976 | Wise et al. ............... 229/305 |
| 3,982,689 | 9/1976 | Retrum . |
| 4,190,162 | 2/1980 | Buescher . |
| 4,308,987 | 1/1982 | Solomon . |
| 4,332,346 | 6/1982 | Kronman . |
| 4,334,618 | 6/1982 | Buescher . |
| 4,382,539 | 5/1983 | Kronman . |
| 4,403,696 | 9/1983 | Newell . |
| 4,595,138 | 6/1986 | Kristel . |
| 4,715,531 | 12/1987 | Stewart . |
| 4,729,507 | 3/1988 | Kim . |
| 4,730,768 | 3/1988 | Gendron . |
| 4,775,095 | 10/1988 | Emmott . |
| 4,917,287 | 4/1990 | Watson . |
| 4,993,624 | 2/1991 | Schlich . |

(List continued on next page.)

FOREIGN PATENT DOCUMENTS 207982 12/1956 Australia ........................ 229/302

OTHER PUBLICATIONS

U.S. Postal Service Form 3227, published Sep. 1974.
U.S. Postal Service Form 3227, published Nov. 1981.
U.S. Postal Service Form 3227, published Sep. 1985.

*Primary Examiner*—Jes F. Pascua
*Attorney, Agent, or Firm*—Thomas R. Vigil

[57] ABSTRACT

The reusable mailing envelope is constructed from a blank comprising a front panel and a rear panel which are connected along a first fold line. A seal flap formation is connected to the front or rear panel along a second line and includes a seal flap having adhesive on a surface thereof for sealing to one of the panels in a first mailing condition. The seal flap formation includes first and second seal flap sections connected to each other along a fold line, which is not a tear line, and one section is connected along a tear line to the seal flap. The seal flap formation defines reusable structure which allows the envelope to be remailed. The first and second seal flap sections have adhesive on and extending at least partially across the inner surfaces thereof for forming a return sealing flap.

16 Claims, 6 Drawing Sheets

U.S. PATENT DOCUMENTS

| | | |
|---|---|---|
| 5,169,061 | 12/1992 | Buescher . |
| 5,197,663 | 3/1993 | Stude . |
| 5,201,464 | 4/1993 | File . |
| 5,213,258 | 5/1993 | Kim . |
| 5,224,647 | 7/1993 | Yanow . |
| 5,232,150 | 8/1993 | Solomons . |
| 5,251,810 | 10/1993 | Kim . |
| 5,277,361 | 1/1994 | Stude . |
| 5,277,362 | 1/1994 | Wilson . |
| 5,288,014 | 2/1994 | Meyers et al. . |
| 5,288,015 | 2/1994 | Sauerwine . |
| 5,328,092 | 7/1994 | File . |
| 5,400,957 | 3/1995 | Stude ................... 229/305 X |
| 5,516,040 | 5/1996 | Lin ........................... 229/302 |

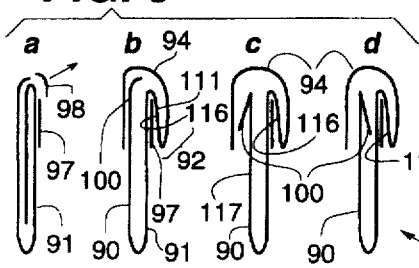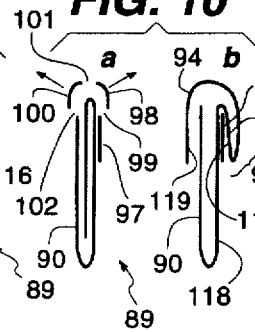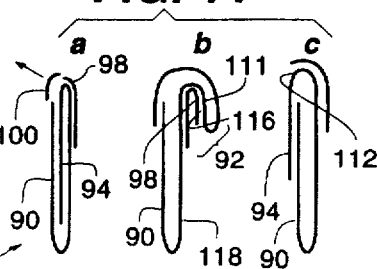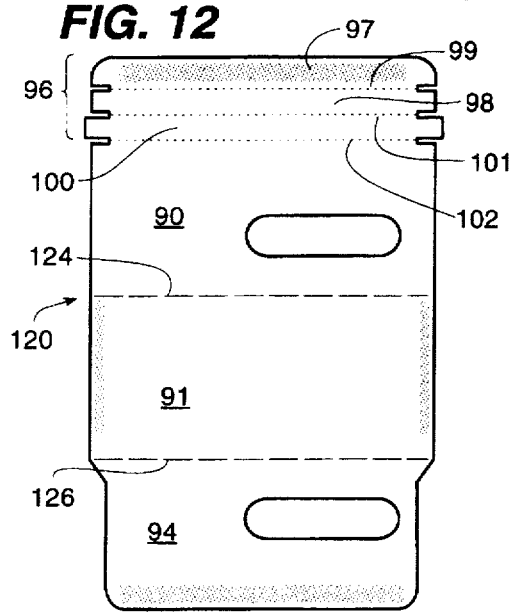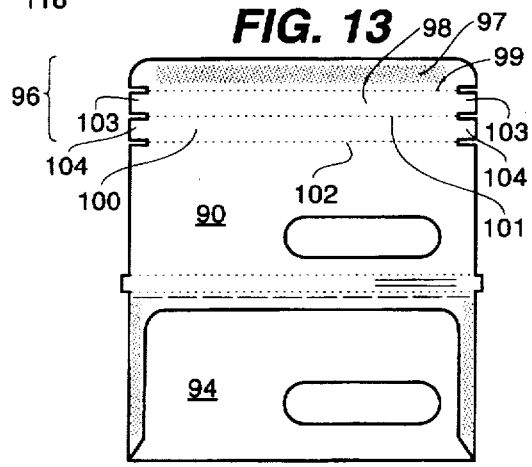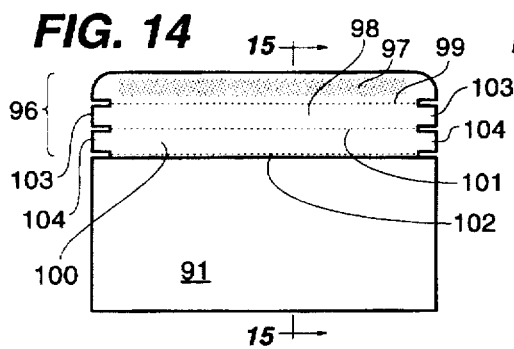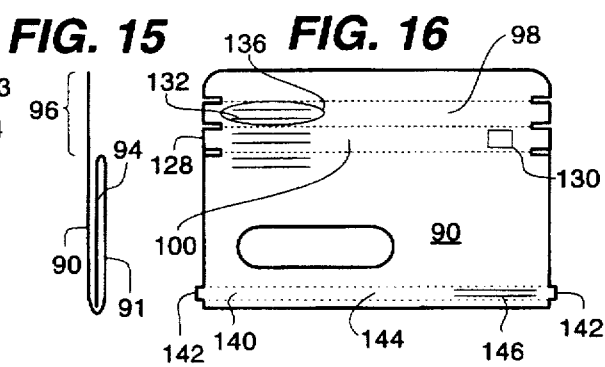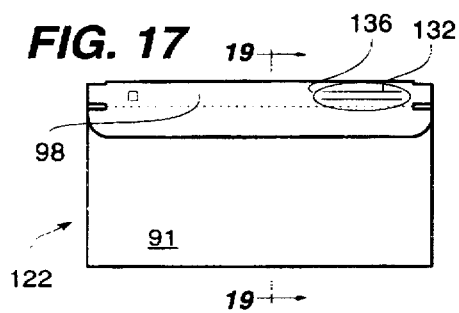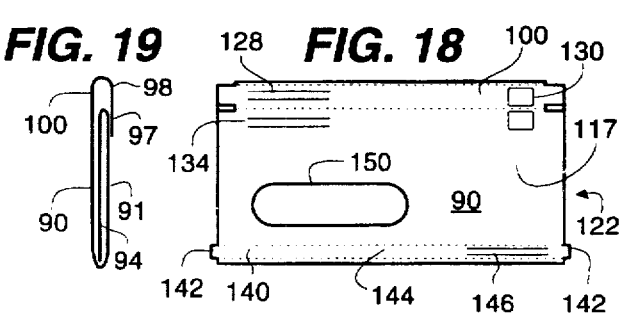

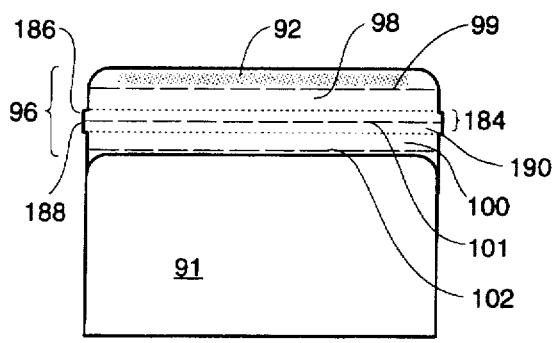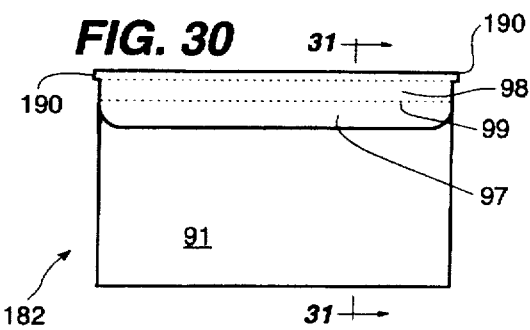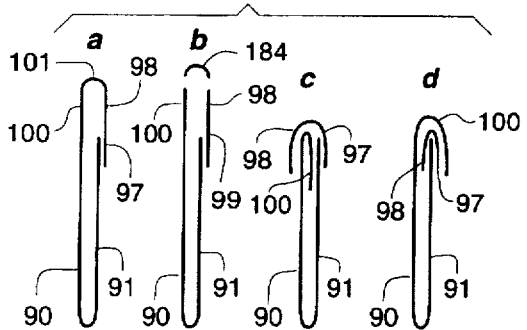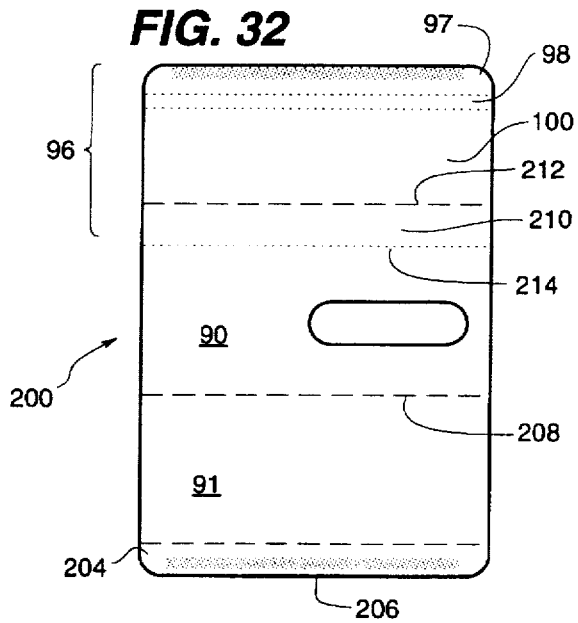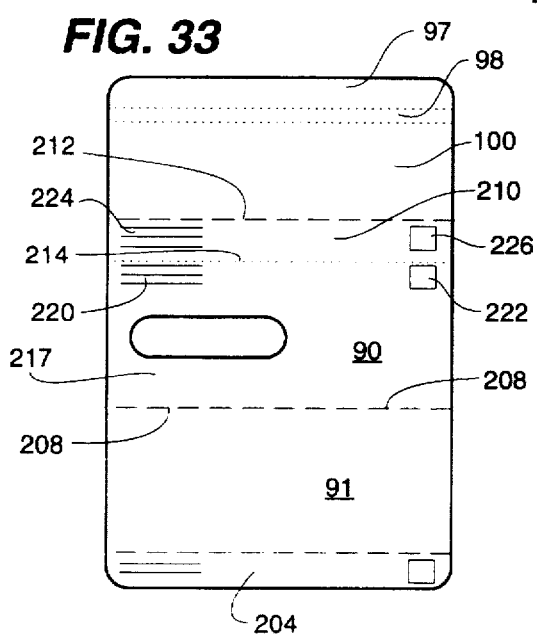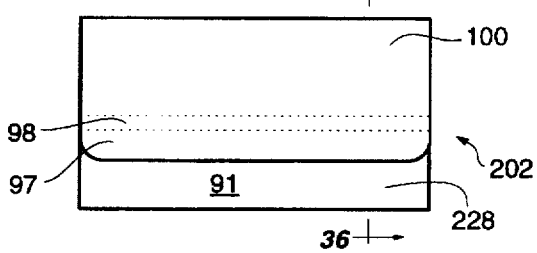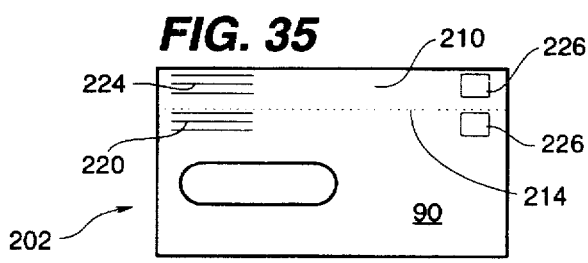

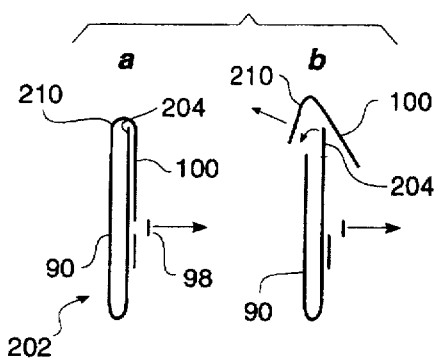
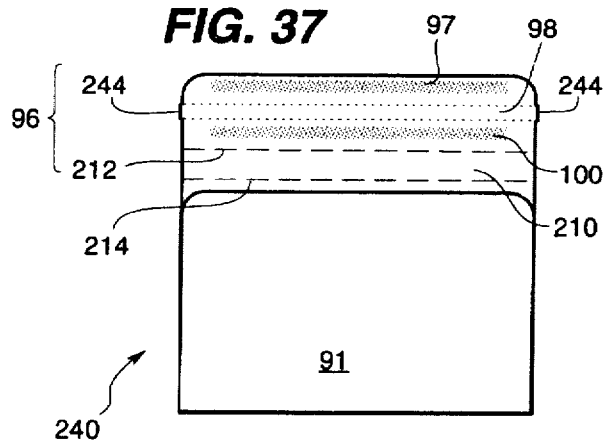
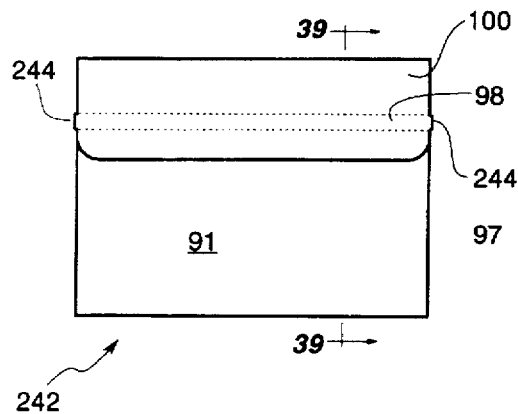
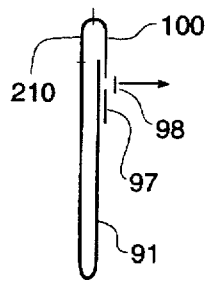
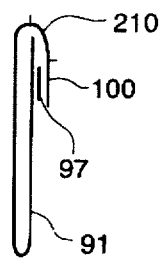
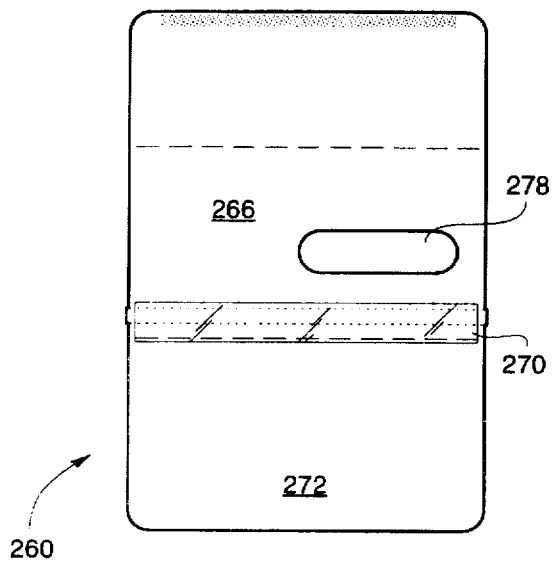
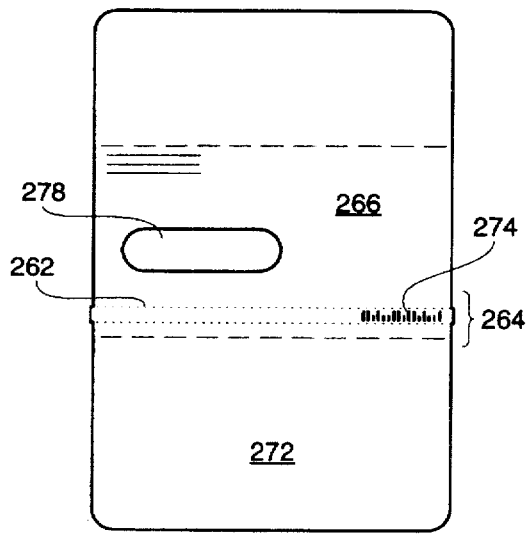

REUSABLE REPLY ENVELOPE

CROSS-REFERENCE TO RELATED APPLICATIONS

This is a 35 U.S.C. 371 Application from PCT/US 94/11705 filed on Oct. 14, 1994, which is a continuation of U.S. application Ser. No. 08/024,733 filed on Mar. 1, 1993, now U.S. Pat. No. 5,400,957, issued Mar. 28, 1995.

FIELD OF THE INVENTION

The present invention relates to improvements in envelopes adapted for reuse and, more particularly, to a reusable mailing envelope which is adapted for use for original mail and then for reuse for return mail.

DESCRIPTION OF THE RELATED ART

Heretofore, a number of reusable mailing envelope structures have been proposed. Examples of some of these envelope structures are disclosed in the following U.S. patents and foreign patent publications:

| U.S. Pat. No. | Patentee |
| --- | --- |
| 5,328,092 | File |
| 5,288,015 | Sauerwine |
| 5,288,014 | Meyers et al. |
| 5,277,362 | Wilson |
| 5,277,361 | Stude |
| 5,251,810 | Kim |
| 5,232,150 | Solomons |
| 5,224,647 | Yanow |
| 5,213,258 | Kim |
| 5,201,464 | File |
| 5,197,663 | Stude |
| 5,169,061 | Buescher |
| 4,993,624 | Schlich |
| 4,917,287 | Watson |
| 4,775,095 | Emmott |
| 4,730,768 | Gendron |
| 4,729,507 | Kim |
| 4,715,531 | Stewart |
| 4,595,138 | Kristel |
| 4,403,696 | Newell |
| 4,382,539 | Kronman |
| 4,334,618 | Buescher |
| 4,332,346 | Kronman |
| 4,308,987 | Solomon |
| 4,190,162 | Buescher |
| 3,982,689 | Retrum |
| 3,635,392 | Burgher |
| 3,027,067 | Johnson |
| 3,111,257 | Peach |
| 1,953,192 | Rossiter |
| 1,575,769 | Kaye |
| 1,091,172 | Thayer |
| 1,064,302 | Donohue |
| 192,522 | Marshall |
| British Pat. Pub. Nos. | Applicant |
| 9,043 | Wheeldon |
| 11,572 | Edmund |
| 128,074 | Morely |
| 555,079 | Roberts |
| Italian Pat. No. 34,731 to V. Pizzicara | |
| Swiss Pat. No. 85,876 to Schönenberger & Gall | |

See also U.S. Postal Service Form 3227, versions published September 1974; November 1981; and September 1985.

See also U.S. Postal Service Form 3227, versions published September 1974; November 1981; and September 1985.

SUMMARY OF THE INVENTION

According to the present invention there is provided a reusable mailing envelope constructed from a blank comprising a front panel having an inner surface and an outer surface, a rear panel having an inner surface and an outer surface and being connected to the front panel along a first fold line and a seal flap formation coupled to one of the front and rear panels along a second line spaced from the first fold line and including a seal flap having adhesive means on a surface thereof which is adapted to face one of the rear or front panels for adhering the seal flap to one of the rear or front panels in a first mailing condition. The seal flap formation further includes a first seal flap section having an inner surface and an outer surface and being connected along a third line to the seal flap and a second seal flap section having an inner surface and an outer surface and being connected along a fourth line to the first seal flap section and being coupled along the second line to one of the front or rear panels. The first seal flap section is folded downwardly along the fourth line. The envelope has an end opening on at least one side edge thereof above the second fold line, between the fourth line on the top and the second line on the bottom and laterally, between the first and second seal flap sections. Structure is provided for securing the front and rear panels together along adjacent side edges thereof. Reusable structure is provided for allowing the envelope to be reused as a mailing envelope and is coupled to one of the panels. The reusable structure includes at least a part of at least one of the first and second seal flap sections. The reusable structure establishes a second mailing condition where at least a portion of one of the seal flap sections of the reusable structure forms a resealing flap which is sealed to at least one surface of the envelope for remailing the reusable envelope. At least one of the first and second seal flap sections has adhesive on and extending at least partially across the inner surface thereof generally parallel to the third and fourth lines and at least a part of the seal flap formation is detachable from the envelope.

Also according to the invention there is provided a reusable mailing envelope constructed from a blank comprising a front panel having an inner surface and an outer surface, a rear panel having an inner surface and an outer surface and being connected to the front panel along a first fold line and a seal flap formation coupled to one of the front and rear panels along a second line spaced from the first fold line and including a seal flap having adhesive means on a surface thereof which is adapted to face one of the rear or front panels for adhering the seal flap to one of the rear or front panels in a first mailing condition. The seal flap formation further includes a first seal flap section having an inner surface and an outer surface and being connected to the seal flap and a second seal flap section having an inner surface and an outer surface and being connected along a third line to the first seal flap section and being coupled along the second line to one of the front or rear panels. The first seal flap section is folded downwardly about the third line and the first and second seal flap sections have substantially the same rectangular extent so as to be congruent and juxtaposed to each other in the first mailing condition with the seal flap formation being folded about the third line. Structure is provided for securing the front and rear panels together along adjacent side edges thereof. Reusable structure is provided for allowing the envelope to be reused as a mailing envelope and is coupled to one of the panels. The reusable structure includes at least a part of at least one of the first and second seal flap sections and the reusable structure establishes a second mailing condition where at least a portion of one of the seal flap sections of the reusable structure forms a resealing flap which is sealed to at least one surface of the envelope for remailing the reusable envelope.

At least one of the first and second seal flap sections has adhesive on and extending at least partially across the inner surface thereof generally parallel to the second line and at least a part of the seal flap formation is detachable from the envelope.

Further according to the invention there is provided a reusable mailing envelope constructed from a blank comprising a front panel having an inner surface and an outer surface, a rear panel having an inner surface and an outer surface and being connected to the front panel along a first fold line and a seal flap formation coupled to one of the front and rear panels and including a first seal flap section having an inner surface and an outer surface and a second seal flap section having an inner surface and an outer surface and being connected along a second line to the first seal flap section. One of the first or second seal flap sections is folded downwardly along the second line. Structure is provided for holding the first and second sealing flap sections adjacent each other in a first mailing condition. The envelope has an end opening on at least one side edge thereof below the second line and laterally, between the first and second seal flap section. Structure is provided for securing the front and rear panels together along adjacent side edges thereof. Reusable structure is provided for allowing the envelope to be reused as a mailing envelope and is coupled to one of the panels. The reusable structure includes at least a part of at least one of the first and second seal flap sections and the reusable structure establishes a second mailing condition where at least a portion of one of the seal flap sections of the reusable structure forms a resealing flap which is sealed to at least one surface of the envelope for remailing the reusable envelope. At least one of the first and second seal flap sections has adhesive on, and extending at least partially across, the inner surface thereof generally parallel to the second line and at least a part of the seal flap formation is detachable from the envelope.

BRIEF DESCRIPTION OF THE DRAWINGS

FIG. 9a is a cross-sectional view of the envelope shown in FIG. 8 but shows a first section of the seal flap removed so that the contents of the envelope can be emptied.

FIG. 9b is a cross-sectional view of the envelope shown in FIG. 9a but shows the envelope resealed in a first manner.

FIG. 9c is a cross-sectional view of the envelope shown in FIG. 9a but shows the envelope resealed in a second manner with a second section of the seal flap folded over the front panel.

FIG. 9d is a cross-sectional view of the envelope shown in FIG. 9a but shows the envelope resealed in a third manner with the second section of the seal flap folded into the envelope.

FIG. 10a is a cross-sectional view of the envelope shown in FIG. 9, but shows a first section and a second section of the seal flap removed so that the contents of the envelope can be emptied.

FIG. 10b is a cross-sectional view of the envelope shown in FIG. 10a but shows the envelope resealed.

FIG. 11a is a cross-sectional view of the envelope shown in FIG. 9 but shows a second section of the seal flap removed.

FIG. 11b is a cross-sectional view of the envelope shown in FIG. 11a but shows a reusable structure folded to a remailing position where a foldable panel portion structure is folded over a top outer margin of a rear panel of the envelope and a reusable closure flap is folded over a front panel of the envelope.

FIG. 11c is a cross-sectional view of the envelope shown in FIG. 11a, but shows a first section of the seal flap adhered to the outer surface of a reusable structure including a reusable closure flap which is folded over a front panel of the envelope.

FIG. 12 is a plan view of a blank, similar to the blank shown in FIG. 1 for use in the construction of another reusable mailing envelope which is constructed according to the teachings of the present invention and which includes a reusable closing flap but without the folded panel portion shown in FIG. 1.

FIG. 13 is a plan view of the blank shown in FIG. 12 but shows a reusable closure flap folded over onto a rear panel of the blank and shows a removable strip having bar code thereon located on the front panel.

FIG. 14 is a rear view of the blank shown in FIG. 12 but shows the rear panel folded upwardly over a front panel of the blank.

FIG. 15 is a cross-sectional view of the blank shown in FIG. 14 and is taken along line 15—15 in FIG. 4.

FIG. 16 is a front view of the reusable mailing envelope blank shown in FIG. 14.

FIG. 17 is a rear view of the reusable mailing envelope with a seal flap thereof folded over and sealed to a rear panel to form an assembled envelope for mailing and shows stamp placement indicia and return address indicia printed on a section of the seal flap.

FIG. 18 is a front view of the reusable mailing envelope shown in FIG. 17 and shows stamp placement indicia and return address indicia on the front panel of the reusable envelope.

FIG. 19 is a cross-sectional view of the envelope shown in FIG. 17 and is taken along the line 19—19 in FIG. 17.

FIG. 29 is a plan view of a blank for use in the construction of a reusable mailing envelope constructed according to the teachings of the present invention, similar to the blank shown in FIG. 22, but which has a tear off portion in the seal flap.

FIG. 30 is a rear view of the blank shown in FIG. 29 but shows the seal flap folded over and sealed to the rear panel to form an assembled envelope.

FIG. 31a is a cross-sectional view of the envelope shown in FIG. 30 and is taken along line 31—31 in FIG. 30.

FIG. 31b is a cross-sectional view of the envelope shown in FIG. 31a and shows the tear off portion of the seal flap pulled off.

FIG. 31c is a cross-sectional view of the envelope shown in FIG. 31b but shows a first section of the seal flap folded into the envelope and a second section of the seal flap folded over the front panel.

FIG. 31d is a cross-sectional view of the envelope shown in FIG. 31b but shows the second section of the seal flap folded into the envelope and the first section folded over the rear panel.

FIG. 32 is a rear plan view of another blank constructed according to the teachings of the present invention.

FIG. 33 is a front view of the blank shown in FIG. 32.

FIG. 34 is a rear view of an envelope formed by folding the rear panel of the blank shown in FIG. 32 up and the seal flap down.

FIG. 35 is a front view of the envelope shown in FIG. 34.

FIG. 36a is a cross-sectional view of the envelope shown in FIG. 34 but shows a middle section of the seal flap removed.

FIG. 36b is a cross-sectional view of the envelope shown in FIG. 36a but shows an upper portion of the seal flap removed so that an upper marginal portion of a rear panel, forming a reusable closure flap, can be folded over the front panel.

FIG. 37 is a rear plan view of another blank constructed according to the teachings of the present invention and shows a rear panel folded up against a front panel and a seal flap which is shorter in width then the seal flap shown in FIG. 32.

FIG. 38 is a rear plan view of an envelope formed by folding the seal flap shown in FIG. 37 downwardly over the rear panel.

FIG. 39 is a cross-sectional view of the envelope shown in FIG. 38, is taken along line 39—39 in FIG. 38 and shows a middle portion of the seal flap pulled away.

FIG. 40 is a cross-sectional view of the envelope shown in FIG. 39 after an upper portion of the seal flap forming a reusable closure flap is pulled down over the rear panel for resealing the envelope for return mailing of the envelope.

FIG. 41 is a rear plan view of a blank for an envelope and shows a piece of solid or transparent backing material, such as rectangular piece of cellophane, adhered to a lower margin of the rear side of a front panel behind a tear off strip in the front panel.

FIG. 42 is a front plan view of the blank shown in FIG. 41 and shows the tear off strip with bar code thereon.

DESCRIPTION OF THE PREFERRED EMBODIMENTS

Figure 1:
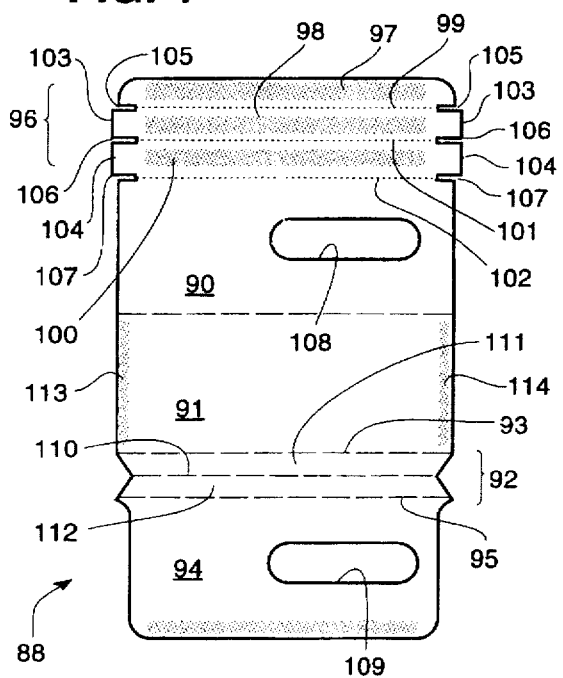
FIG. 1 is a plan view of a blank for use in the construction of a reusable mailing envelope constructed according to the teachings of the present invention, shows side margins of the front and rear panels secured together without side flaps by applying glue to the inside side margins of the rear panel and shows a modified sealing flap structure.

While the reusable mailing envelope of the present invention is susceptible of several constructions, there is shown in FIGS. 1–42 several preferred embodiments of a reusable mailing envelope constructed according to the teachings of the present invention, with the understanding that the present disclosure is not intended to be limited to the specific constructions thereof illustrated in the drawings.

Referring now to FIGS. 1–7, there is illustrated therein an embodiment of a blank 88 for constructing an envelope 89 (FIGS. 6 and 7) according to the teachings of the present invention.

As shown in FIG. 1, the blank 88 includes a front panel 90, a rear panel 91, a foldable panel portion 92 connected along a fold line 93 to an edge of the rear panel 91 and a reusable closure flap 94 connected at a fold line 95 to the panel portion 92. At an upper edge of the front panel 90 there is connected a seal flap formation 96 which includes a seal flap 97 having an adhesive material on an inner surface thereof delineated from a first seal flap panel section 98 by a line 99 which can be a perforation line or a fold line and a second flap panel section 100 separated from the first flap panel section 98 by a line 101 which can be a perforation line or a fold line. Then the flap arrangement 96 is connected to the front panel 90 at a line 102, which can be a perforated line 102 or a fold line 102.

In FIG. 1 the lines 99, 101 and 102 are shown as perforation lines and the inner surface of each flap section 98 and 100 is shown with adhesive material thereon.

Preferably one of the flap seal sections 98 or 100 has a tab 103 and/or 104 protruding from one or both sides edges of the seal flap formation or arrangement 96. In the illustrated embodiment, both flap panel sections 98 and 100 are shown with protruding tabs 103, 104 defined between short narrow slots 105, 106 and 107 at the ends of lines 99, 101 and 102, between the seal flap 97 and the first seal flap section 98, between the first seal flap section 98 and the second seal flap section 100, and between the second seal flap section 100 and the front panel 90, respectively. In actual use, only one of the flap panel sections 98, 100 will have one or two tabs 103, 104 protruding outwardly from the side edge(s) of the blank 88 and the envelope 89 formed from the blank 88.

In the illustrated embodiment, the front panel 90 has a window 108 therein and the reusable closure flap 94 also has a window 109 which, when the closure flap 94 is folded over the front panel 90 for remailing the envelope 89, will register with the window 108 in the front panel 90.

As shown, the foldable panel portion 92 has a center fold line 110 separating the panel portion 92 into a first panel section 111 and a second panel section 112.

Figure 2:
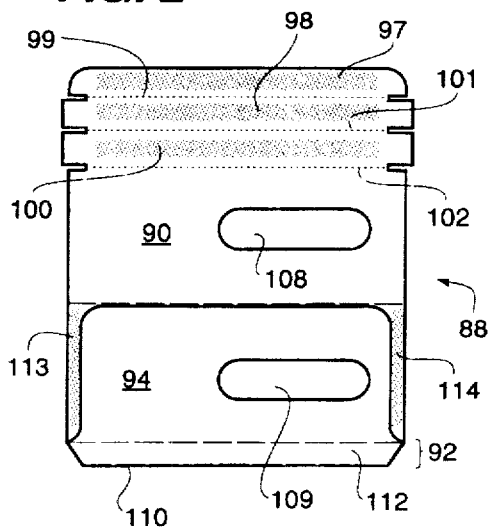
FIG. 2 is a plan view of the blank shown in FIG. 1 but shows a reusable closure flap folded over onto the rear panel of the blank.

In constructing the envelope 89, the closure flap 94 and the panel sections 111 and 112 of the foldable panel portion 92 are folded about the center fold line 110 upwardly to the position shown in FIG. 2

Figure 3:
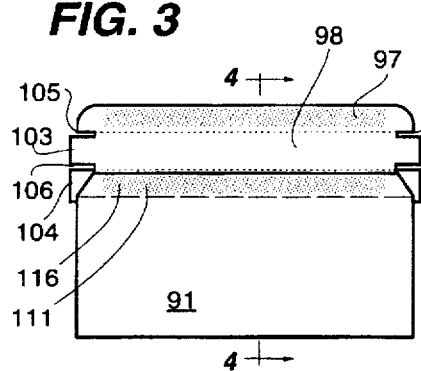
FIG. 3 is a plan view of the blank shown in FIG. 2 but shows the rear panel folded upwardly over a front panel of the blank and sealed along the edges.

Next, the rear panel 91 having the closure flap 94 folded thereupon is folded upwardly to the position shown in FIG. 3.

As shown in FIGS. 1 and 2, side margins 113 and 114 of the rear panel 91 have an adhesive or glue thereon for sealing with adjacent side margins of the front panel 90 when the rear panel 91 and the reusable closure flap 94 are folded upwardly from the position shown in FIG. 2 to the position shown in FIG. 3.

Of course, in the alternative, side flaps can be used as described above in connection with the embodiment shown in FIGS. 6–11 as will be shown hereinafter.

In FIG. 1, both of the flap panel sections 98 and 100 are shown having a glue, adhesive or gum thereon, although, in practice, probably only one of the two flap panel sections 98 or 100 will have adhesive thereon.

Figure 6:
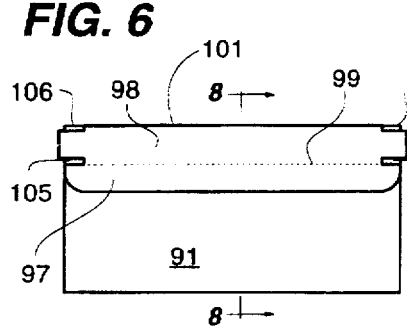
FIG. 6 is a rear view of the reusable envelope with the seal flap folded over and sealed to form an assembled envelope ready for mailing.
Figure 7:
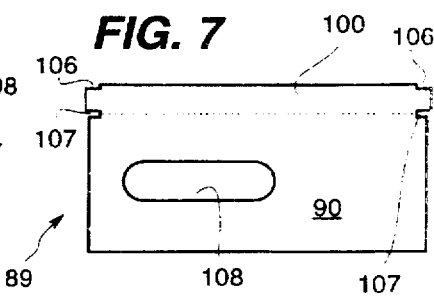
FIG. 7 is a front view of the envelope shown in FIG. 6.

Also, as noted above, in actual practice only one of the flap panel sections 98 or 100 will have end tabs 103 or 104 protruding beyond the side edges of the envelope 89 as shown in FIGS. 6 and 7.

Also, it will be noted that the slots 105, 106 and 107 are formed in the seal flap formation 96 at the end of each perforation line 99, 101 and 102 to facilitate separating one or the other flap panel sections 98 or 100 from the sealed envelope 89. Further, it is to be understood that if only one flap panel section 98 or 100 is to be removed, then the other flap panel section 100 or 98 will not only not have end tabs 103 or 104, but also it probably will not have slots 105 or 107 at each end of the perforation line 99 or 102 and that other line instead, will be a fold line.

Figure 4:
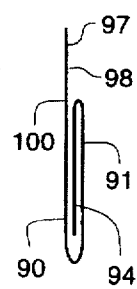
FIG. 4 is a cross-sectional view of the blank shown in FIG. 19 and is taken along the line 4—4 in FIG. 3.
Figure 5:
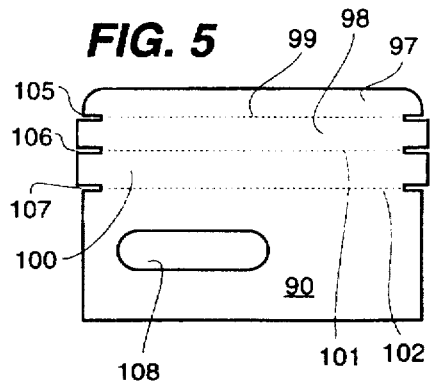
FIG. 5 is a front view of the blank shown in FIG. 3.

From the partially formed mailing envelope shown in FIGS. 3 and 4, the seal flap arrangement 96 is folded about the middle perforation line 106 and the seal flap 97 is sealed to a rear outer surface of the rear panel 91, as shown in FIG. 6.

As shown, the reusable closure flap 94 and the front panel 90 each have a window 108 and 109, respectively therein and it will be understood that the window 109 in the reusable closure flap 94 is adapted to mate with the window 108 in the front panel 90 when the mailing envelope 89 is reused for return mail.

Figure 8:
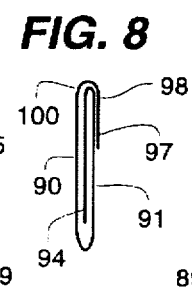
FIG. 8 is a cross-sectional view of the envelope shown in FIG. 6 and is taken along line 8—8 in FIG. 6.

FIG. 8 illustrates the cross section of the reusable envelope 89 when it is closed and sealed for initial mailing.

Turning now to FIGS. 9–11, FIG. 9a illustrates removal of the first flap panel section 98. Then FIG. 9B shows how the foldable panel portion 92 and the reusable closure flap 94 are pulled out of the envelope and folded over for remailing. In this embodiment, the second flap panel section 100 is not folded but allowed to remain extending upwardly and the reusable closure flap 94 is folded thereover. In the meantime, as shown, the foldable panel portion 92 is folded down over the rear panel 91 so that an outer surface 116 of the panel section 111 having adhesive thereon can be adhered to the back of the envelope 89 over the outer surface of the seal flap 97.

FIG. 9c shows where the second flap panel section 100 is folded outwardly and downwardly and the reusable closure flap 94 is folded thereover and sealed to outer surface 117 of the front panel 90.

FIG. 9d shows where the second flap panel section 100 is folded inwardly into the envelope and the reusable closure flap 94 is folded over the front panel 90 and sealed thereto.

FIG. 10c shows an embodiment where all three lines 99, 101 and 102 in the seal flap formation 96 are perforation lines and both the first flap panel section 98 and the second flap panel section 100 are removed. Then the foldable panel portion 92 is folded out and the outer surface 116 of the panel section 111 is sealed to the back side of the envelope 89, i.e., to outer surface 118 of the rear panel 91, and the reusable closure flap 94 is folded over the front panel 90 and a marginal area 119 on an inner surface oft and adjacent a free edge of, the closure flap 94, which has adhesive material thereon, is sealed to the outer surface 117 of the front panel, as shown in FIG. 10b.

In FIG. 11a, the second flap panel section 100 is removed leaving the first seal flap section 98 adjacent the reusable closure flap 94. The outer surface 116 of the panel section 111 then can be folded downwardly with, and over, the first seal flap section 98 and adhered to the outer surface 118 of the rear panel 91.

When the reusable mailing envelope 89 is used in this manner, the panel section 111 of the foldable panel portion 92 has sufficient width to extend beyond the backward-folded-over first flap section 98 as shown in FIG. 11b. Then the reusable closure flap 94 is folded over the front panel 90 and sealed thereto as shown in FIG. 11b.

As an alternative, and as shown in FIG. 11c, the first flap section 98 initially can be secured with an adhesive material to the outer surface of the panel section 112 of the foldable panel portion 92 and the foldable panel portion 92, unfolded, and the reusable closure flap 94 can be folded forwardly over the front panel and sealed thereto as shown in FIG. 11c.

Another embodiment of a blank 120 for forming a reusable mailing envelope 122 and constructed according to the teachings of the present invention is illustrated in FIGS. 12–21. In this mailing envelope 122, the foldable panel portion 92 of the blank 88 and the envelope 89 shown in FIGS. 1–11 is omitted.

Instead, the blank 120 comprises the front panel 90, the rear panel 91 connected at fold line 124 to the front panel 90, the reusable closure flap 94 connected at fold line 126 to the rear panel and the seal flap formation or arrangement 96.

Then, as shown in FIG. 13, the reusable closure flap 94 is folded upwardly over the rear panel 91. Next, as shown in FIG. 14, the rear panel 91 and reusable closure flap 94 are folded upwardly to the position shown in FIG. 14.

As in FIGS. 1–3, the seal flap formation 96 includes the sealing flap 97 which has adhesive, glue or gum on an inner surface thereof, and which is connected at the line 99 to the first seal flap panel section 98, the second seal flap panel section 100 which is connected to the first flap panel section 98 at the fold or perforation line 101 and which is connected to the front panel at the line 102.

One of the seal flap sections 98 or 100 has a pull tab 103 or 104 at each end thereof.

Also provided in this embodiment of a blank 120 and envelope 122 is address indicia 128 and a stamp placement area 130 on the outer surface of the second flap section 100 which can be used for an initial return address and stamp or postage area for the initial mailing of the envelope 122.

Additionally address indicia 132 can be provided on the outer surface of the first flap section 98 in the event the second seal flap section 100 is intended to be pulled or torn off and the first seal flap section 98 is used as a reusable closure flap and folded over the front panel 90 and adhered thereto. Then the address indicia 132 can be used as the return address for the remailing of the envelope 122.

Additionally or alternatively, address indicia 134 can be provided on the upper portion of the outer surface 117 of the front panel 90 and alternatively, a window 136 can be provided in the first seal flap section 98, instead of the address indicia 132, the window 136 being arranged to register with the address indicia 134 on the front panel 90 when the first flap section 98 is folded over the front panel 90 for the remailing of the envelope 122.

Further in this embodiment, the front panel 90 for the reusable envelope 122 is provided with a tear strip 140 in and adjacent bottom of the front panel 90 of the envelope 122. Typically, although not shown, some form of backing material such as paper or clear plastic material, e.g. cellophane, is adhered to the back side of the lower margin of the front panel 90 and to the lower margin of the inside of the rear panel 91 so that when the tear strip 140 is pulled off by gripping an end tab 142 of the tear strip 140 and pulling the tear strip 140 away from the envelope 122 shown in FIG. 18, the integrity of the envelope 122 is maintained.

If desired, indicia 146 can be provided on the outer surface 144 of the tear strip 140, which indicia 146 typically can be in the form of bar code, for facilitating mailing of the envelope to the addressee with the bar code having the zip code and other pertinent data relating to the address of the addressee. It will be understood that for remailing of such an envelope the bar code indicia 146 needs to be removed to prevent mismailing of the reusable envelope back to the initial addressee. Also, a return stuffing can have address indicia, such as bar code, thereon which is located on the stuffing or backing material so as to register with the window created by the removal of the tear strip 140. This can be in addition to address indicia on the stuffing adapted to register with a window 150 in the front panel, if a window 150 is provided in the envelope 122.

As will be described in greater detail hereinafter, FIGS. 41 and 42 illustrate the use of a piece of backing material, such as cellophane, over the inside surfaces of the front and the rear panels of an envelope in the area of a tear strip like the tear strip 140.

Since the reusable envelope 122 does not have a foldable panel portion 92, the reusable closure flap 94 is folded directly into the envelope 122 and the seal flap formation 96 is folded along the fold or perforation line 101 and the seal flap 97 is adhered to the back side of the envelope 122 as best shown in FIGS. 17 and 19. This will leave a space above the lines 99 and 102 between the front panel 90 and the rear panel 91 as well as end openings in the edges of the envelope 122 above the front and rear panels 90 and 91.

Figure 20:
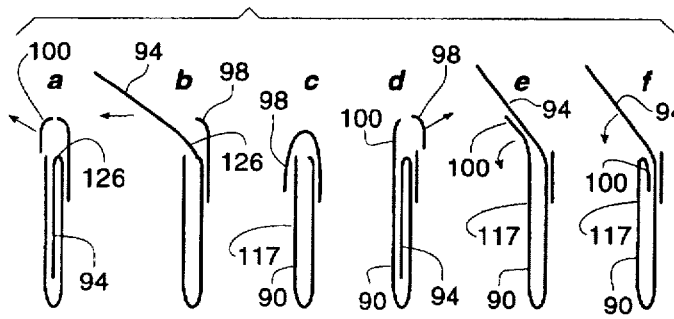
FIG. 20a is a cross-sectional view of the envelope shown in FIG. 19 but shows a first section of the seal flap removed after the initial addressee receives the envelope.
FIG. 20b is a cross-sectional view of a modified embodiment of the envelope shown in FIG. 20a and shows a second section serving as a reusable closure flap and the flap folded into the envelope section serving as a detachable advertising sheet.
FIG. 20c is a cross-sectional view of the envelope shown in FIG. 20b and shows a reusable closure flap defined by a second section of the seal flap folded over the front panel of the envelope.
FIG. 20d is a cross-sectional view of the envelope shown in FIG. 19 but shows a second section of the seal flap removed.
FIG. 20e is a cross sectional view of the envelope shown in FIG. 20d and shows the reusable closure flap being folded over the first section of the seal flap and the front panel.
FIG. 20f is a cross-sectional view of the envelope shown in FIG. 20d and shows the first section of the seal flap folded into the envelope and shows the reusable closure flap being folded down over the front panel.
Figure 21:
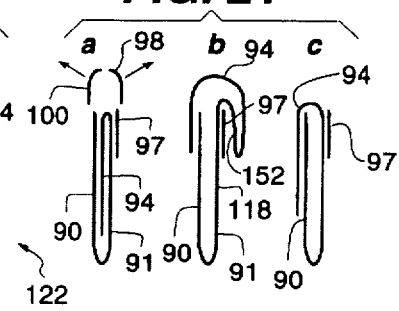
FIG. 21a is a cross-sectional view of the envelope shown in FIG. 19, but shows first and second sections of the seal flap removed after the initial addressee receives the envelope.
FIG. 21b is a cross-sectional view of the envelope shown in FIG. 21a and shows the reusable closure flap folded over the front panel and a part of the reusable closure including a foldable panel portion which is folded over the rear panel.
FIG. 21c is a cross-sectional view of the envelope shown in FIG. 21a and shows the reusable closure flap folded over the front panel.
Figure 22:
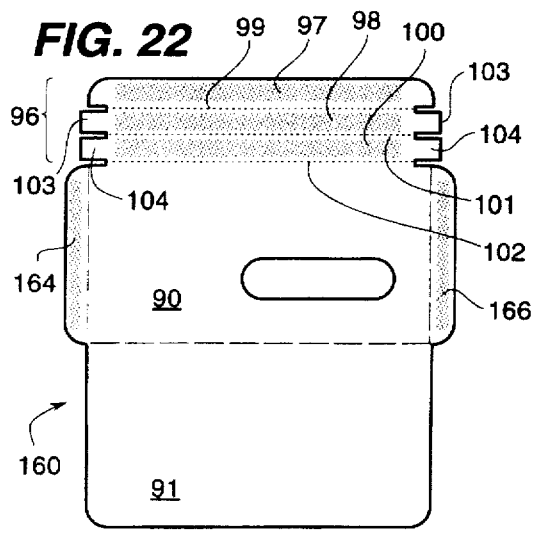
FIG. 22 is a front plan view of a blank for use in the construction of another reusable mailing envelope constructed according to the teachings of the present invention which includes a reusable seal flap, having three panel sections, with at least two of the sections having adhesive, glue or gum on an inner surface thereof.

The manner in which this reusable envelope 122 is opened and then reused is shown in FIGS. 20 and 21.

In FIG. 20a, the second flap section 100 is shown removed. Then, the reusable closure flap 94 is pulled out of the envelope. In this embodiment, the reusable closure flap 94 is not used as a reclosure flap 94, but instead, is used as an advertising piece which is separable at the perforation/fold line 126. For this purpose the line 126 is perforated.

Then, the first flap panel section 98 can be folded forwardly and sealed to the outer surface 117 of the front panel 90 as shown in FIG. 20c.

In the embodiment shown in FIGS. 20d, 20e and 20f, the first flap panel section 98 is removed, followed by removal of the contents of the envelope. Then, as shown in FIG. 20e, the reusable closure flap 94 is pulled out and folded downwardly over the second flap panel section 100 which is folded with the reusable closure flap 94 against the front panel 90 and the reusable closure flap 94 is then sealed to the outer surface 117 of the front panel 90 for remailing of the envelope 122.

Alternatively, the second flap panel section 100 can be folded inwardly into the envelope 122 followed by folding of the reusable closure flap 94 downwardly over the front panel 90 of the envelope 122.

In FIG. 21a, both flap panel sections 98 and 100 are removed. Then, the reusable closure flap 94 is pulled out and, if desired, a portion 152 thereof adjacent the rear panel 91 can have been provided with fold lines therein to form a foldable panel portion 152 which is then folded over the seal flap 97 and the outer surface 118 of the rear panel 91 of the envelope 122 as shown in FIG. 21b.

Alternatively, the reusable closure flap 94 can be pulled out of the envelope 122 and then sealed to the front panel 90 only, as shown in FIG. 21c.

FIGS. 22–28 illustrate another embodiment of a blank 160 for constructing a reusable mailing envelope 162 (FIGS. 24 and 25) according to the teachings of the present invention. The blank 160 includes the front panel 90, the rear panel 91, the seal flap formation or arrangement 96 and side flaps 164 and 166. Omitted from this embodiment is the foldable panel portion and the reusable closure flap which, in this embodiment, is realized or defined by the first seal flap section 98 or the second seal flap section 100.

Figure 23:
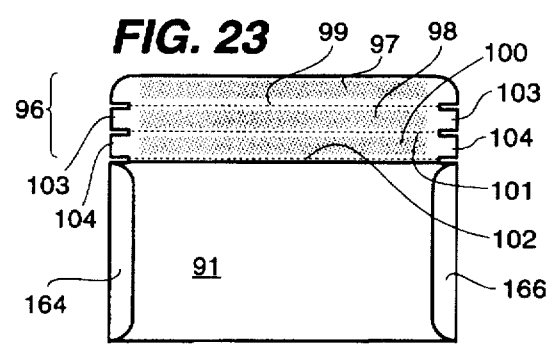
FIG. 23 is rear plan view of the blank shown in FIG. 22, and shows the rear panel folded upwardly over a front panel and side flaps folded over the rear panel and sealed.
Figure 24:
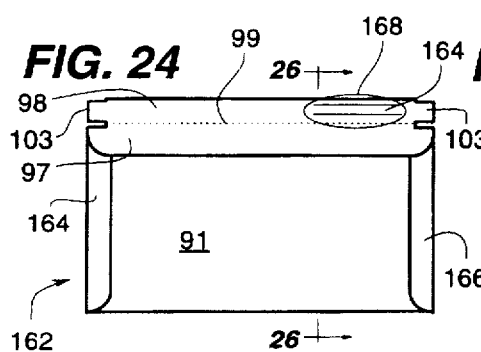
FIG. 24 is a rear view of the blank shown in FIG. 23, having the seal flap folded over the rear panel and sealed to form an assembled envelope for mailing and showing either return address indicia on, or a window in, a first section of the seal flap.

The rear panel 91 is folded upwardly over the front panel 90 as shown in FIG. 23 and then the seal flap 97 is folded over the rear panel 91 and adhered thereto as shown in FIG. 24.

Like in the previous two embodiments described above, the fold first and/or second seal flap sections 98 and/or 100 can have end tabs 103 or 104. Likewise, the outer surfaces of the first and/or second flap sections 98 and/or 100 can have address indicia 164 or 166 or a window 168; and the front panel 90 can have address indicia 170 on the outer surface 117 thereof and a tear strip 172 with or without bar code thereon.

Figure 25:
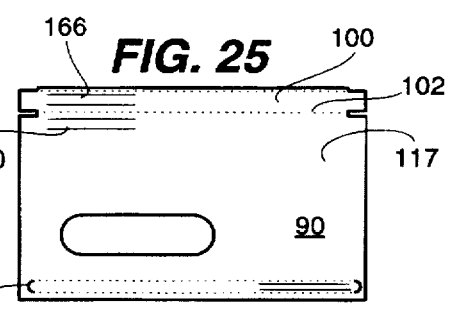
FIG. 25 is a front view of the envelope shown in FIG. 24 and shows return address indicia on the outer surface of the front panel of the envelope and on a second section of the seal flap and a removable strip having bar code thereon in the front panel at the bottom thereof.
Figure 27:
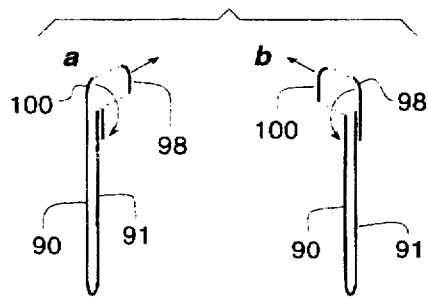
FIG. 27a is a cross-sectional view of the envelope shown in FIG. 26 and shows a first section of the seal flap removed so that a second section of the seal flap can be folded downwardly over the rear panel to seal the envelope for its second mailing.
FIG. 27b is a cross-sectional view of the envelope shown in FIG. 26, and shows the second section of the seal flap removed so that the first seal flap section can be folded downwardly over the front panel to seal the envelope for its second mailing.

From the view of the envelope in FIG. 23, the seal flap formation 96 is folded to the position shown in FIG. 24 and the seal flap 97 is sealed to the back side of the envelope 162. A front side of this envelope 162 is shown in FIG. 25 and shows the addresses indicia 166 on the outer surface of the second flap seal section 100 and on the outer surface 117 of the front panel 90.

Figure 26:
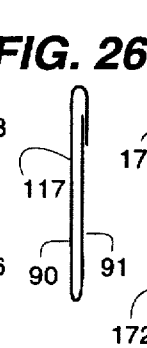
FIG. 26 is a cross-sectional view of the envelope shown in FIG. 24 and is taken along line 26—26 in FIG. 24.

Starting from a cross section of the envelope 162 shown in FIG. 26, the first flap panel section 98 can be removed and the second flap panel section 100 can be folded downwardly as shown in FIG. 27a.

Alternatively, the second flap panel section 100 can be removed and the first flap panel section 98 folded downwardly over the front panel 90 as shown in FIG. 27b.

Figure 28:
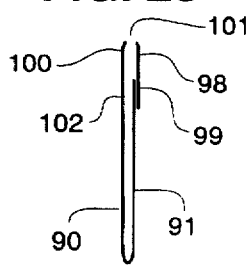
FIG. 28 is a cross-sectional view of the envelope shown in FIG. 16 and shows the seal flap opened along the top edge of the envelope such that the envelope can be reused in the manner shown in FIG. 31c or 31d.

In the embodiment shown in FIG. 28, the lines 99 and 102 can be fold lines only and not perforated lines. In this embodiment, the envelope 162 will be open by inserting an implement, such as a letter opener, into the upper space above the top edges of the front and rear panels 90 and 91 and between the first and second seal flap sections 98 and 100. Alternatively a string, like the string disclosed in FIG. 13 of U.S. Pat. No. 5,197,663 can be used. Then the envelope 162 is opened by cutting or pulling through the perforations of the perforated line 101 so as to separate the first and second seal flap sections 98 and 100 as shown in FIG. 28. Then one of these flap panel sections 98 or 100 can be folded into the envelope 162 and the other flap panel section 100 or 98 folded over the front panel or the rear panel as shown in FIGS. 31c and 31d. Note that in this embodiment, the inner surfaces of both seal flap sections 98 and 100 can have an adhesive material thereon.

In FIGS. 29-31, there is shown a modified embodiment of a blank 180 for constructing an envelope 182, similar to the envelope 162 shown in FIGS. 22-28. In this embodiment, the envelope 182 shown in FIG. 30 is formed from the blank 180 shown in FIG. 29, which is similar to the blank 160 shown in FIGS. 22 and 23 except for the fact that a tear away portion 184 is provided between the first and second seal flap sections 98 and 100 in the seal flap formation 96. Also, this embodiment does not utilize side flaps 164 or 166, but instead has adhesive in the margins along the side edges of either the front or rear panel 90 or 91 for being adhered to opposite margins adjacent side edges on the other panel 91 or 90.

The tear away portion 184 of the seal flap formation 96 is defined by parallel spaced perforation lines 186 and 188, each located in one of the seal flap sections 98 or 100 on opposite sides of the fold line 101. Preferably, a tab 190 protrudes outwardly from one or both ends of this middle tear away portion 184 as shown in FIGS. 29 or 30.

In use, the user will grip the folded tab 190 at either end of the tear away or break away portion 184 and pull it upwardly to open the envelope 182, as shown in FIG. 31b. Then, one of the seal flap panel sections 98 or 100 can be folded into the envelope and the other seal flap section 100 or 98 can be folded over the front 90 or rear 91 panel and secured thereto as shown in FIG. 31c and FIG. 31d.

Still another embodiment of a blank 200 (FIGS. 32 and 33) for constructing a reusable envelope 202 (FIGS. 34 and 35) is shown in FIGS. 32-36.

FIG. 32 is a rear plan view of the blank 200 and shows a rear panel 91 having a reusable sealing flap portion 204 with adhesive on an inner surface thereof defined in the marginal area adjacent a free edge 206 of the rear panel 91 which is folded up along a fold line 208 between the rear panel 91 and the front panel 90. A seal flap formation 96 has, in addition to the first and second seal flap sections 98 and 100, a third seal flap section 210 connected at a line 212 to the second seal flap section 100 and at a line 214 to the front panel 90. The line 214 can be a perforated line and the line 212 can be a fold line.

As shown in FIG. 33, the area on the outer surface 217 of the front panel 90 between the fold line 208 and the perforation line 214 has address indicia 220 and a stamp placement area 222. The address indicia 220 can be located lower than shown so that it will still be visible when the closure flap portion 204 is folded over the front panel 90. The third seal flap section 210 also has on the outer surface thereof address indicia 224 and a stamp placement area 226.

As shown in FIGS. 32, 33 and 34, the first seal flap section 98 is a tear away strip of small width and the second seal flap section 100 is much wider for extending downwardly over much of the outer surface 228 of the rear panel 91.

As shown in FIG. 34, after the rear panel 91 is folded upwardly the seal flap formation 96 is folded downwardly and the seal flap 97 is adhered to the outer surface 228 of the rear panel 91.

FIG. 35 illustrates the front of the envelope 202.

As shown in FIG. 36a, the first seal flap section 98 is removed to open the envelope 202. Then, as shown in FIG. 36b, the second and third seal flap sections 100 and 210 are removed by pulling the third seal flap section 210 at the perforation line 214 and the reusable sealing flap portion 204 then can be folded forwardly over the front panel 90 and sealed thereto. The outer surface of the closure flap portion 204 can be provided with address indicia and a stamp location area for use in the return mailing of the envelope 202.

FIGS. 37-40 illustrate a modified embodiment of a blank 240 and a reusable envelope 242 (FIG. 38) constructed therefrom according to the teachings of the present invention which is similar to the blank 200 and envelope 202 just described above.

In this embodiment, the upper marginal area 204 of the rear panel 91 is not used as reusable closure flap and the second seal flap section 100 is not as wide and has adhesive material on an inner surface thereof. Also the lines 212 and 214 are both fold lines.

In use, the seal flap formation 96 is folded downwardly about the fold line 212 over the rear panel 91 and the seal flap 97 is secured thereto as shown in FIG. 38. Then as shown in FIG. 39, to remove the contents of the envelope 242 after its first mailing, the first seal flap section 98 is pulled away by gripping an end tab 244 of the first seal flap section 98 and pulling the seal flap section 98 from the envelope 242.

Then, the third seal flap section 210 is folded rearwardly over the rear panel 91 and the second seal flap section 100, forming a reusable closure flap, is pulled downwardly and adhered to the outer surface of the rear panel 91.

With reference to FIGS. 41 and 42 showing the front and back of an envelope blank 260, it is intended that, in some of the embodiments described above, when an initial mailing is made, bar code can be provided on a tear-off strip 262 provided in a lower margin 264 of a front panel 266. Then, to maintain the envelope in tact after the tear-off strip 262 is pulled away from the front panel 266 of an envelope formed from the blank 260, a sheet of backing material 270, which can be preprinted with bar code or which can be made of a transparent material such as cellophane, is situated over and fixed to the lower inside portion of the front panel 266 and lower inside portion of a rear panel 272 and behind the tear-off strip 262 in the lower margin of the front panel 266 as best shown in FIG. 41. In this way, after the blank 260 is folded into an envelope and the envelope is mailed, bar code 274 (FIG. 38) can be provided on the tear-off strip 262 and can be used by the postal service for directing the mail to its proper location. Then, after the envelope is received at its proper location, the user can pull away the tear-off strip 262 with the bar code 274 thereon leaving the folded backing material 270, which can be opaque paper, clear or translucent plastic or a sheet of cellophane, at the bottom of the envelope. Then, a stuffing that is contained in the envelope and which is reinserted into the envelope by the reuser of the envelope, such as a customer of a public utility, e.g. the telephone company, the electric company, the gas company, etc., can reinsert the stuffing with a bar code thereon indicating the address of the public utility located on the lower edge of the stuffing or insert so as to be visible through the clear plastic or cellophane sheet 270 at the lower margin of the front panel 266 of the envelope. The insert or stuffing will also, of course, have an address for the receiver of the remailed envelope, i.e., a public utility, which will appear in a window 278 in the front panel of the envelope. In this way, the mail can be quickly delivered to the sender, e.g. a public utility, by means of both the printed address appearing in the window 278 and the bar code address appearing through the cellophane sheet 270 at the lower margin of the front panel 266 of the envelope.

Figure 43:
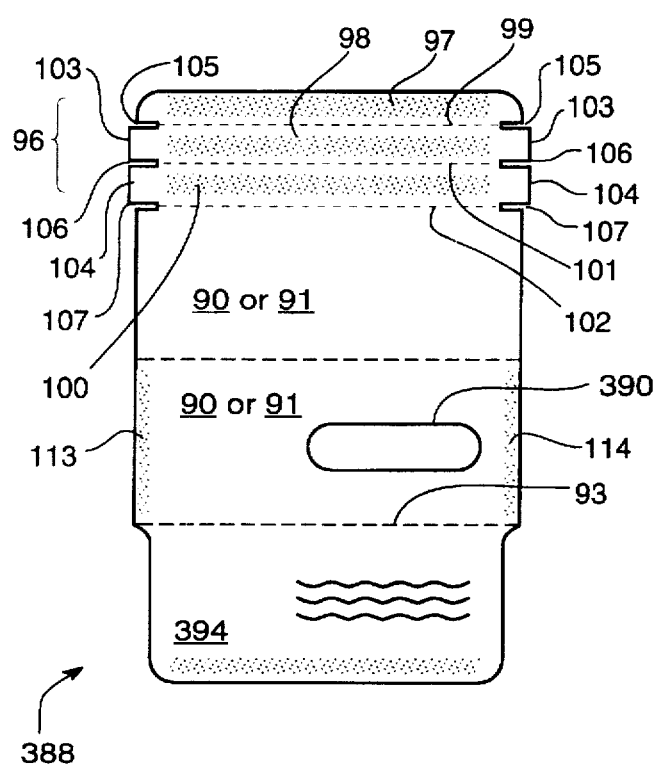
FIG. 43 is a front plan view of a blank similar to the blank of FIG. 1, but having a window in the rear panel.

In FIG. 43, there is illustrated a blank 388, similar to blank 88 shown in FIG. 1, but having a window 390 in the rear panel 91, which alternatively be considered a front panel 90. Attached to the rear panel 91 (or front panel 90) is an additional panel 394 which can have information thereon and which can be detached from the rear panel 91 and inserted in the envelope formed from the blank 388.

From the foregoing description, it will be understood that modifications can be made to the various embodiments of the reusable envelope and the blanks for forming same constructed according to the teachings of the present invention and described above. Also, it will be apparent that the reusable envelopes and blanks for making same described above have a number of advantages and features some of which have been disclosed above and others of which are inherent therein. Accordingly, the scope of the invention is only to be limited as necessitated by the accompanying claims.

I claim:

1. A reusable mailing envelope constructed from a blank comprising:

a front panel having an inner surface and an outer surface, a rear panel having an inner surface and an outer surface and being connected to said front panel along a first fold line, a seal flap formation coupled to one of said front and rear panels along a second line spaced from said first fold line and including a seal flap having adhesive means on an surface thereof which is adapted to face one of said rear or front panels for adhering said seal flap to one of said rear or front panels in a first mailing condition, said seal flap formation further including a first seal flap section having an inner surface and an outer surface and being connected along a third line to said seal flap and a second seal flap section having an inner surface and an outer surface and being connected along a fold line which is not a tear line to said first seal flap section and being coupled along said second line to one of said front or rear panels, said first seal flap section being folded downwardly along said fold line, said envelope having an end opening on at least one side edge thereof above said second fold line, between said fold line on the top and said second line on the bottom and laterally, between said first and second seal flap sections, structure for securing said front and rear panels together along adjacent side edges thereof, and reusable structure, for allowing the envelope to be reused as a mailing envelope, coupled to one of said panels, said reusable structure including at least a part of said first and second seal flap sections, and said reusable structure establishing a second mailing condition where at least a portion of each one of said seal flap sections of said reusable structure forms a resealing flap which is sealed to at least one surface of said envelope for remailing said reusable envelope, said first and second seal flap sections having adhesive on and extending at least partially across said inner surface thereof generally parallel to said third line and said fold line, said seal flap sections not being adhered to each other in the first or second mailing conditions, and at least a part of said seal flap formation being detachable from said envelope.

2. The envelope of claim 1 wherein said third line is a perforated line.

3. The envelope of claim 1 wherein said envelope includes an additional panel which is hingedly connected to said rear or front panel not having said seal formation attached thereto and which is a detachable panel having information thereon.

4. The envelope of claim 1 wherein at least one of said seal flap sections has address indicia on the outer surface thereof.

5. The envelope of claim 1 wherein said second seal flap section above said front panel has address indicia and a stamp placement area on an outer surface thereof which can be used for the initial mailing of the envelope.

6. The envelope of claim 1 wherein at least one of said front or rear panels has a designated area on an outer surface of a lower portion thereof and said designated area is a tear away area.

7. The envelope of claim 1 wherein at least one of said front or rear panels has a designated area on an outer surface of a lower portion thereof and said area has machine readable indicia thereon which is removable by pulling said machine readable indicia away from said outer surface of at least one of said front or rear panels.

8. The envelope of claim 7 wherein said envelope has adhered to an inner surface of said front panel or of said rear panel or of both, and generally over and adjacent to said designated area, a piece of backing material for retaining the integrity of said envelope after said designated area is separated from said envelope.

9. The envelope of claim 8 wherein said backing material in the area of said pulled away designated area has pre-printed address indicia thereon.

10. The envelope of claim 8 wherein said backing material is transparent and a return mail piece is provided having address indicia thereon which will be located in the area of said pulled away designated area when the return mail piece is inserted into said envelope for remailing of said envelope.

11. The envelope of claim 1 wherein said front panel or said rear panel has a mailing window therein and an initial mailing piece is received in said envelope and has address indicia that is located in said mailing window.

12. The envelope of claim 1 wherein said seal flap formation has means associated therewith for facilitating opening of said envelope.

13. A reusable mailing envelope constructed from a blank comprising:

a front panel having an inner surface and an outer surface, a rear panel having an inner surface and an outer surface and being connected to said front panel along a first fold line, a seal flap formation coupled to one of said front and rear panels along a second line spaced from said first fold line and including a seal flap having adhesive means on a surface thereof which is adapted to face one of said rear or front panels for adhering said seal flap to one of said rear or front panels in a first mailing condition, said seal flap formation further including a first seal flap section having an inner surface and an outer surface and being connected to said seal flap and a second seal flap section having an inner surface and an outer surface and being connected along a third fold line which is not a tear line to said first seal flap section and being coupled along said second line to one of said front or rear panels, said first seal flap section being folded downwardly about said third line and said first and second seal flap sections having substantially the same rectangular extent with substantially the same length and with substantially the same width so as to be congruent and juxtaposed to each other in said first mailing condition with said seal flap formation being folded about said third line, the space between said seal flap sections being open on each side of the envelope, structure for securing said front and rear panels together along adjacent side edges thereof, and reusable structure, for allowing the envelope to be reused as a mailing envelope, coupled to one of said panels, said reusable structure including at least a part of at least one of said first and second seal flap sections, and said reusable structure establishing a second mailing condition where at least a portion of one of said seal flap sections of said reusable structure forms a resealing flap which is sealed to at least one surface of said envelope for remailing said reusable envelope, at least one of said first and second seal flap sections having adhesive on and extending at least partially across said inner surface thereof generally parallel to said second line and at least a part of said seal flap formation being detachable from said envelope.

14. A reusable mailing envelope constructed from a blank comprising:

a front panel having an inner surface and an outer surface, a rear panel having an inner surface and an outer surface and being connected to said front panel along a first fold line, a seal flap formation coupled to one of said front and rear panels and including a first seal flap section having an inner surface and an outer surface and a second seal flap section having an inner surface and an outer surface and being connected along a second fold line which is not a tear line to said first seal flap section, one of said first or second seal flap sections being folded downwardly along said second line and means for holding said first and second sealing flap sections adjacent each other in a first mailing condition, said envelope having an end opening on at least one side edge thereof below said second line and laterally, between said first and second seal flap sections, structure for securing said front and rear panels together along adjacent side edges thereof, and reusable structure, for allowing the envelope to be reused as a mailing envelope, coupled to one of said panels, said reusable structure including a part of said first and second seal flap sections, and said reusable structure establishing a second mailing condition where at least part of each one said seal flap sections of said reusable structure forms a resealing flap which is sealed to at least one surface of said envelope for remailing said reusable envelope, at least a part of said first seal flap section and at least a part of said second seal flap section having adhesive on and extending at least partially across said inner surface thereof generally parallel to said second line, said seal flap sections not being adhered to each other in the first or second mailing conditions, and at least a part of said seal flap formation being detachable from said envelope.

15. A reusable mailing envelope constructed from a blank comprising:

a front panel having an inner surface and an outer surface, a rear panel having an inner surface and an outer surface and being connected to said front panel along a first fold line, a seal flap formation coupled to one of said front and rear panels along a second line spaced from said first fold line and including a seal flap having adhesive means on an surface thereof which is adapted to face one of said rear or front panels for adhering said seal flap to one of said rear or front panels in a first mailing condition, said seal flap formation further including a first seal flap section having an inner surface and an outer surface and being connected along a third line to said seal flap and a second seal flap section having an inner surface and an outer surface and being connected along a fourth line to said first seal flap section and being coupled along said second line to one of said front or rear panels, said first seal flap section being folded downwardly along said fourth line, said envelope having an end opening on at least one side edge thereof above said second fold line, between said fourth line on the top and said second line on the bottom and laterally, between said first and second seal flap sections, structure for securing said front and rear panels together along adjacent side edges thereof, reusable structure, for allowing the envelope to be reused as a mailing envelope, coupled to one of said panels, said reusable structure including at least a part of at least one of said first and second seal flap sections, and said reusable structure establishing a second mailing condition where at least a portion of one of said seal flap sections of said reusable structure forms a resealing flap which is sealed to at least one surface of said envelope for remailing said reusable envelope, at least one of said first and second seal flap sections having adhesive on and extending at least partially across said inner surface thereof generally parallel to said third and fourth lines and at least a part of said seal flap formation being detachable from said envelope, and at least one of said front or rear panels having a designated area on an outer surface thereof and said designated area is a tear away area.

16. A reusable mailing envelope constructed from a blank comprising:

a front panel having an inner surface and an outer surface, a rear panel having an inner surface and an outer surface and being connected to said front panel along a first fold line, a seal flap formation coupled to one of said front and rear panels along a second line spaced from said first fold line and including a seal flap having adhesive means on an surface thereof which is adapted to face one of said rear or front panels for adhering said seal flap to one of said rear or front panels in a first mailing condition, said seal flap formation further including a first seal flap section having an inner surface and an outer surface and being connected along a third line to said seal flap and a second seal flap section having an inner surface and an outer surface and being connected along a fourth line to said first seal flap section and being coupled along said second line to one of said front or rear panels, said first seal flap section being folded downwardly along said fourth line, said envelope having an end opening on at least one side edge thereof above said second fold line, between said fourth line on the top and said second line on the bottom and laterally, between said first and second seal flap sections, structure for securing said front and rear panels together along adjacent side edges thereof, reusable structure, for allowing the envelope to be reused as a mailing envelope, coupled to one of said panels, said reusable structure including at least a part of at least one of said first and second seal flap sections, and said reusable structure establishing a second mailing condition where at least a portion of one of said seal flap sections of said reusable structure forms a resealing flap which is sealed to at least one surface of said envelope for remailing said reusable envelope, at least one of said first and second seal flap sections having adhesive on and extending at least partially across said inner surface thereof generally parallel to said third and fourth lines and at least a part of said seal flap formation being detachable from said envelope, and at least one of said front or rear panels having a designated area on an outer surface thereof and said designated area has machine readable indicia thereon, said designated area being removable from said outer surface of at least one of said front or rear panels.

* * * * *